United States Patent
Chao et al.

(10) Patent No.: US 11,893,773 B2
(45) Date of Patent: Feb. 6, 2024

(54) FINGER VEIN COMPARISON METHOD, COMPUTER EQUIPMENT, AND STORAGE MEDIUM

(71) Applicant: Ping An Technology (Shenzhen) Co., Ltd., Guangdong (CN)

(72) Inventors: Zhongdi Chao, Guangdong (CN); Bojin Zhuang, Guangdong (CN); Shaojun Wang, Guangdong (CN)

(73) Assignee: Ping An Technology (Shenzhen) Co., Ltd., Guangdong (CN)

( * ) Notice: Subject to any disclaimer, the term of this patent is extended or adjusted under 35 U.S.C. 154(b) by 480 days.

(21) Appl. No.: 17/178,911

(22) Filed: Feb. 18, 2021

(65) Prior Publication Data
US 2021/0174104 A1  Jun. 10, 2021

Related U.S. Application Data

(63) Continuation of application No. PCT/CN2019/104331, filed on Sep. 4, 2019.

(30) Foreign Application Priority Data

Apr. 3, 2019  (CN) .......................... 201910263866.4

(51) Int. Cl.
*G06F 18/214* (2023.01)
*G06V 10/764* (2022.01)
(Continued)

(52) U.S. Cl.
CPC .......... *G06V 10/764* (2022.01); *G06F 18/214* (2023.01); *G06V 10/82* (2022.01); *G06V 40/10* (2022.01); *G06V 40/14* (2022.01)

(58) Field of Classification Search
CPC ...... G06V 10/764; G06V 10/82; G06V 40/10; G06V 40/14; G06F 18/214; G06F 18/24
See application file for complete search history.

(56) References Cited

U.S. PATENT DOCUMENTS

2005/0148876 A1* 7/2005 Endoh ................. G06V 40/145
                                                      600/454
2008/0199058 A1* 8/2008 Chou .................. G06V 40/145
                                                      382/125
(Continued)

FOREIGN PATENT DOCUMENTS

CN          107832684 A          3/2018
CN          108491835 A          9/2018
(Continued)

OTHER PUBLICATIONS

CN109409227A—Wuyi University; (A kind of finger vena plot quality appraisal procedure and its device based on multichannel CNN) (Year: 2019).*

(Continued)

*Primary Examiner* — Solomon G Bezuayehu
(74) *Attorney, Agent, or Firm* — IP Spring

(57) ABSTRACT

A finger vein comparison method, a computer equipment, and a storage medium are provided. The finger vein comparison method includes: two finger vein images to be compared are obtained (S10); image channel fusion is performed on the two finger vein images to be compared to obtain a two-channel target finger vein image to be compared (S20); the target finger vein image to be compared is input into a feature extractor, and a feature vector of the target finger vein image to be compared is extracted by the feature extractor (S30); the feature vector of the target finger vein image to be compared is input into a dichotomy classifier to obtain a dichotomy result (S40); and it is determined according to the dichotomy result whether the two finger vein images to be compared come from the same finger (S50).

20 Claims, 2 Drawing Sheets

(51) Int. Cl.
*G06V 40/10* (2022.01)
*G06V 10/82* (2022.01)
*G06V 40/14* (2022.01)

(56) References Cited

U.S. PATENT DOCUMENTS

| | | | |
|---|---|---|---|
| 2011/0304720 A1* | 12/2011 | Kumar | G06V 40/1359 |
| | | | 382/116 |
| 2012/0057011 A1* | 3/2012 | Horng | H04N 7/183 |
| | | | 348/E7.085 |
| 2012/0155765 A1 | 6/2012 | Joshi et al. | |
| 2013/0028490 A1* | 1/2013 | Kim | G06T 5/50 |
| | | | 382/128 |
| 2015/0023572 A1* | 1/2015 | Williform | G06V 40/1312 |
| | | | 382/124 |
| 2015/0356362 A1 | 12/2015 | Demos | |
| 2016/0239703 A1* | 8/2016 | Park | G06F 18/00 |
| 2018/0300571 A1* | 10/2018 | Che | G06V 10/32 |
| 2019/0026453 A1* | 1/2019 | Choi | G06V 40/1324 |
| 2021/0287025 A1* | 9/2021 | Min | G06V 10/143 |

FOREIGN PATENT DOCUMENTS

| | | |
|---|---|---|
| CN | 108615002 A | 10/2018 |
| CN | 109409227 A | 3/2019 |
| CN | 110175500 A | 8/2019 |
| JP | 2018018350 A | 2/2018 |
| WO | 2018198233 A1 | 11/2018 |

OTHER PUBLICATIONS

JPO, Notice of Reasons for Refusal for corresponding Japanese Patent Application No. JP2021-506411, dated Mar. 15, 2022, 6 pages.
CNIPA, International Search Report for International Patent Application No. PCT/CN2019/104331, dated Dec. 27, 2019, 2 pages.

* cited by examiner

FINGER VEIN COMPARISON METHOD, COMPUTER EQUIPMENT, AND STORAGE MEDIUM

CROSS-REFERENCE TO RELATED APPLICATIONS

This application is a continuation under 35 U.S.C. § 120 of PCT Application No. PCT/CN2019/104331 filed on Sep. 4, 2019, which claims priority under 35 U.S.C. § 119(a) and/or PCT Article 8 to Chinese Patent Application No. 201910263866.4 filed on Apr. 3, 2019, the disclosures of which are hereby incorporated by reference in their entireties.

TECHNICAL FIELD

The application relates to the field of artificial intelligence, in particular to a finger vein comparison method, a computer equipment, and a storage medium.

BACKGROUND

Finger vein recognition technology is a biological recognition technology that performs personal identification using a vein image obtained by penetrating the finger with near infrared ray. Among all kinds of biological recognition technologies, the finger vein recognition technology is a technology using internal biological characteristics that are not visible from the outside for recognition, so it has high anti-counterfeit performance. However, at present, most of the research on finger vein recognition is still confined to closed set recognition. Because it is impossible to obtain finger vein images of all people for network training in reality, such a closed set recognition network is not applicable to scenarios of finger vein comparison in real life, so accuracy of the finger vein comparison in real life scenarios is low.

SUMMARY

In view of this, embodiments of the application provide a finger vein comparison method, a computer equipment, and a storage medium.

In a first aspect, the embodiments of the application provide a finger vein comparison method, which includes the following operations: obtaining two finger vein images to be compared, the two finger vein images to be compared being single-channel images; performing image channel fusion on the two finger vein images to be compared to obtain a two-channel target finger vein image to be compared; inputting the target finger vein image to be compared into a feature extractor, and extracting a feature vector of the target finger vein image to be compared by the feature extractor, the feature extractor being trained by using a two-channel convolutional neural network; inputting the feature vector of the target finger vein image to be compared into a dichotomy classifier to obtain a dichotomy result; and determining according to the dichotomy result whether the two finger vein images to be compared come from the same finger.

In a second aspect, a computer equipment is provided, which includes a memory, a processor, and a computer readable instruction stored in the memory and capable of running on the processor. The processor, when executing the computer readable instruction, implements the steps of the finger vein comparison method.

In a third aspect, the embodiments of the application provide a non-transitory computer readable storage medium, which includes a computer readable instruction. When executed by the processor, the computer readable instruction implements the steps of the finger vein comparison method.

BRIEF DESCRIPTION OF THE DRAWINGS

In order to more clearly illustrate technical solutions in the embodiments of the application, the accompanying drawings of the embodiments are simply introduced below. It is apparent for those of ordinary skill in the art that the accompanying drawings in the following description are only some embodiments of the application, and some other accompanying drawings may also be obtained according to these on the premise of not contributing creative effort.

DETAILED DESCRIPTION OF THE EMBODIMENTS

In order to better understand the technical solutions of the application, the embodiments of the application are described in detail below in combination with the accompanying drawings.

It should be clear that the described embodiments are only part, rather than all, of the embodiments of the application. All other embodiments obtained by those of ordinary skill in the art based on the embodiments in the application without creative work shall fall within the scope of protection of the application.

Terms used in the embodiments of the application are for the purpose of describing particular embodiments only and are not intended to limit the application. Singular forms "a", "an" and "the" used in the embodiments of the application and the appended claims of the present disclosure are also intended to include the plural forms unless the context clearly indicates otherwise.

It is to be understood that the term "and/or" used in the application is only the same field that describes the associated object and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that although the terms first, second, third, and the like may be adopted in the embodiments of the application to describe various features, but these features should not be limited to these terms. These terms are only adopted to distinguish the features. For example, without departing from the scope of the embodiments of the application, a first feature may also be called a second feature; similarly, a second feature may also be called a first feature.

For example, the term "if" used here may be explained as "while" or "when" or "responsive to determining" or "responsive to detecting", which depends on the context. Similarly, based on the context, the phrase "if determining" or "if detecting (stated condition or event)" may be explained as "when determining" or "responsive to determining" or "when detecting (stated condition or event)" or "responsive to detecting (stated condition or event)".

Figure 1:
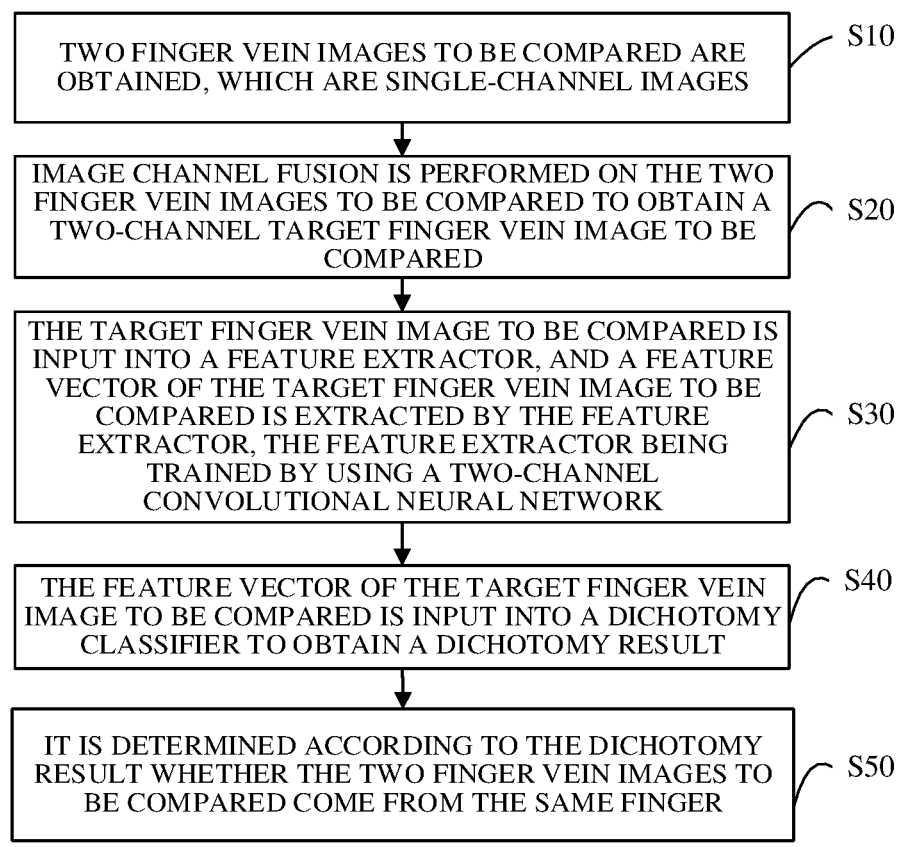
FIG. 1 is a flowchart of a finger vein comparison method according to an embodiment of the application.

FIG. 1 is a flowchart of a finger vein comparison method according to an embodiment of the application. The finger vein comparison method may be applied in a finger vein comparison system. The finger vein comparison system may be used to determine whether finger vein images come from the same finger. The finger vein comparison system may be specifically applied to computer equipment. The computer equipment can interact with users, and includes, but not limited, to a computer, a smart phone, a tablet, etc. As shown in FIG. 1, the finger vein comparison method includes the following steps.

At S10, obtain two finger vein images to be compared, which are single-channel images.

The finger vein image to be compared refers to a finger vein image for finger vein comparison. It is understandable that the specifications of the two finger vein images to be compared are the same. For example, the specifications of both the two finger vein images to be compared are 128*256. When a finger vein collecting device is used to collect finger vein images, the specifications of the collected finger vein images are allowed to be different. In this case, the finger vein images collected may be consistent in specifications through size transformation and other processing, so as to carry out finger vein comparison more accurately.

The two finger vein images to be compared are single-channel images. It is understandable that in order to improve the efficiency of finger vein comparison, after the finger vein collecting device is used to collect the finger vein images, not only the specifications of finger vein images are unified, but also the collected finger vein images are preprocessed, so that the preprocessed finger vein images can reflect the features of the finger vein images with less data. Converting the collected finger vein image into a single-channel image is a method. The channel of the image is related to how it is coded. If the image is decomposed into three components of Red, Green and Blue (RGB) for representation, there are three channels. If the image is a grayscale image, there is one channel Specifically, in the embodiment, the collected finger vein images may be uniformly converted into grayscale images, at this point, the collected finger vein images are single-channel images. If the finger vein image to be compared is the single-channel image, the comparison efficiency of the finger vein images can be improved, and a finger vein comparison result can be obtained according to the finger vein image to be compared.

In an embodiment, two single-channel finger vein images to be compared may be obtained by preprocessing the finger vein image collected by the finger vein collecting device.

At S20, perform image channel fusion on the two finger vein images to be compared to obtain a two-channel target finger vein image to be compared.

The fusion of image channels refers to the superposition of image channels. For example, a red-channel image, a green-channel image and a blue-channel image are fused to obtain one image containing a red channel, a green channel, and a blue channel.

In an embodiment, image channel fusion is performed on two finger vein images to be compared. That is, the two finger vein images to be compared are superposed to obtain one finger vein image including the single channel corresponding to each of the two finger vein images to be compared, and this finger vein image is a two-channel image, called a target finger vein image to be compared. The target finger vein image to be compared includes the information of the original single channel of two finger vein images to be compared, and has a deep feature about the level of similarity between the two finger vein images to be compared after the fusion of image channels (understandably, the deep features about the level of similarity between the two finger vein images to be compared that the finger vein images to be compared coming from the same finger have after channel fusion and the finger vein images to be compared coming from different fingers have after channel fusion, are different). It is possible to determine, based on the deep feature, whether two finger vein images to be compared come from the same finger.

Further, S20 in which the two finger vein images to be compared are fused on image channels to obtain a two-channel target finger vein image to be compared specifically includes the following steps.

At S21, obtain a single-channel pixel matrix of the first finger vein image to be compared.

At S22, obtain a single-channel pixel matrix of the second finger vein image to be compared.

Understandably, the image is composed of pixels and may be represented by pixel matrix. Specifically, the single-channel image is represented by a single-channel pixel matrix.

In an embodiment, the single-channel pixel matrix of the first finger vein image to be compared and the single-channel pixel matrix of the second finger vein image to be compared are obtained to fuse the image channels.

At S23, perform image channel fusion on pixel values of corresponding positions in the single-channel pixel matrix of the first finger vein image to be compared and in the single-channel pixel matrix of the second finger vein image to be compared to obtain the target finger vein image to be compared.

Understandably, the fusion of image channels refers to the superposition of image channels. A pixel includes the position of the pixel on the image and its value. In the embodiment, the specifications of the two images to be compared are the same, so the images should be correspondingly fused according to the position of the pixel. After fusion, the pixels in the two channels are independent of each other, which is equivalent to that an image is represented by the pixels of two channels.

In S21 to S23, through the fusion of image channels, one image can be used to represent two images to be compared, which is beneficial to improving the efficiency of finger vein comparison. Moreover, after the fusion of image channels, the target finger vein image to be compared has the deep feature about the level of similarity between two finger vein images to be compared, and based on the deep feature, it is possible to determine whether two finger vein images to be compared come from the same finger.

At S30, input the target finger vein image to be compared into a feature extractor, and extract a feature vector of the target finger vein image to be compared by the feature extractor, the feature extractor being trained by using a two-channel convolutional neural network.

The two-channel convolutional neural network is a convolutional neural network for recognizing a two-channel image, which has a good effect on extracting the feature vector of the two-channel image. The feature extractor trained by the two-channel convolutional neural network can extract the feature vector from the two-channel image. The feature vector can accurately reflect the deep feature of the two-channel image.

In an embodiment, the feature extractor is used to extract the feature vector of the input target finger vein image to be compared. Because the feature extractor is trained by the two-channel convolutional neural network, it can accurately extract the feature vector of the target finger vein image to be compared, which is helpful to compare the finger vein images to be compared according to the feature vector and obtain an accurate finger vein comparison result.

Further, before S30, that is, before is input the target finger vein image to be compared into the feature extractor, the method further includes the following steps.

At S31, obtain a finger vein sample to be trained.

The sample for training and the sample for testing in the finger vein sample(s) to be trained do not overlap with each other and follow the standard of open set. Understandably, at present, finger vein recognition basically stays in a closed set, and all the samples used for testing have appeared in a training set. In this case, a trained model will overfit. The accuracy rate for the finger vein comparison of the sample in the closed set is high, but the accuracy rate for the comparison in real life scenarios (under the open set condition) is low, which cannot meet the requirements of normal finger vein comparison. In real life scenarios, there are few data sets about the finger vein images, but the standard of open set is still followed when a feature extraction model is trained, so that the samples used for training and the samples used for testing do not overlap with each other, which can effectively improve the generalization ability of the model.

At S32, input the finger vein sample to be trained into the two-channel convolutional neural network for training, and use an enhanced edge cosine loss function to calculate a loss value generated in the training process. The two-channel convolutional neural network includes four convolution layers, four pooling layers, and one fully connected layer. The first layer, the third layer, the fifth layer, and the seventh layer of the two-channel convolutional neural network are the convolution layers; the second layer, the fourth layer, the sixth layer, and the eighth layer are the pooling layers; and the ninth layer is the fully connected layer.

In the embodiment, calculating the loss value generated in the model training process specifically uses the enhanced edge cosine loss function. The enhanced edge cosine loss function takes a normalized feature vector as the input (the two-channel convolutional neural network extracts and normalizes the feature vector of the input finger vein sample to be trained), and can further maximize the decision boundary of the learned deep feature in a cosine angular space and learn the highly discriminative deep feature by maximizing an interclass cosine edge.

In the embodiment, the network structure specifically adopted by the two-channel convolutional neural network is only four convolution layers, four pooling layers, and one fully connected layer. The first layer, the third layer, the fifth layer, and the seventh layer of the two-channel convolutional neural network are the convolution layers; the second layer, the fourth layer, the sixth layer, and the eighth layer are the pooling layers; and the ninth layer is the fully connected layer. The network structure is simple, on the premise of accurately extracting the feature vector of the finger vein sample to be trained, the efficiency of model training is effectively improved, and the real-time performance of finger vein comparison can be guaranteed.

At S33, update the two-channel convolutional neural network according to the loss value to obtain the feature extractor.

The loss value reflects the value of deviation between the output result of training and the actual expectation. A back propagation algorithm may be used to iterate and update network parameters in the two-channel convolutional neural network according to the loss value, so that the output result after each network update is closer to the actual expectation. When the training reaches the preset number of iterations or all change values of the network parameters are less than an iteration stopping threshold, the training ends and the feature extraction model is obtained. The feature extraction model is trained to extract the feature vector of the two-channel image, and can extract the feature vector of the target finger vein image to be compared in real time and accurately.

In S31 to S33, a specific implementation mode of training to obtain the feature extraction model is provided. The training process follows the standard of open set and can improve the generalization ability of the model. Moreover, the two-channel convolutional neural network for training uses the enhanced edge cosine loss function to calculate the loss value generated in the training process, and the two-channel convolutional neural network is iterated and updated to obtain the feature extraction model. In this way, the loss generated in the training process can be described more accurately, and it is helpful to improve the efficiency of model training and the feature extraction ability of the feature extraction model.

Further, S31 in which the finger vein sample to be trained is obtained specifically includes the following steps.

At S311, obtain single-channel finger vein images to be trained.

Understandably, if the finger vein image initially collected by the finger vein collecting device is not the single-channel image, the initially collected finger vein image is converted, according to the specified image preprocessing, into a single-channel finger vein image to be trained with uniform standards.

At S312, perform image channel fusion on every two single-channel finger vein images to be trained to obtain a two-channel finger vein image to be trained.

In real life scenarios, there are relatively few data sets about the finger vein image. In the embodiment, by using the fusion processing method of image channel, every two single-channel finger vein images to be trained are fused into a two-channel finger vein image to be trained, and n single-channel finger vein images to be trained are increased to $n*(n-1)/2$ two-channel finger vein images to be trained, so that the data set of the finger vein image can be more fully utilized.

At S313, if the single-channel finger vein images to be trained for fusing come from the same finger, set a label value of the two-channel finger vein image to be trained to 0.

At S314, if the single-channel finger vein images to be trained for fusing do not come from the same finger, set the label value of the two-channel finger vein image to be trained to 1.

In an embodiment, it is needed to mark the obtained two-channel finger vein image to be trained in advance, so as to effectively update the network parameters through the marked label values in the process of training the feature extraction model. The comparison of finger vein images is a dichotomy problem, so the label value may be set according to whether the single-channel finger vein images to be trained for fusing come from the same finger.

At S315, obtain the finger vein sample to be trained according to the set label value.

Understandably, after the label value of a two-channel finger vein sample to be trained is set, the finger vein sample to be trained for the training feature extraction model is obtained.

In S311 to S315, a specific implementation mode of obtaining the finger vein sample to be trained is provided; by using the fusion processing method of image channel, every two single-channel finger vein images to be trained are fused into a two-channel finger vein image to be trained, and n single-channel finger vein images to be trained are increased to n*(n−1)/2 two-channel finger vein images to be trained, so that the data set of the finger vein image can be more fully utilized; and the label value is assigned according to whether the single-channel finger vein images to be trained for fusing come from the same finger, which is helpful to effectively adjust the network parameters in the process of training the feature extraction model.

At S40, input the feature vector of the target finger vein image to be compared into a dichotomy classifier to obtain a dichotomy result.

The dichotomy classifier may be a classifier pre-trained by using the neural network, specifically a Support Vector Machine (SVM) dichotomy classifier. The SVM dichotomy classifier can output two classification results according to the input feature vector. Specifically, the input feature vector may be the feature vector of the target finger vein image to be compared, and the classification result may be the classification result about whether two finger vein images to be compared come from the same finger.

In an embodiment, the feature vector of the target finger vein image to be compared is input into the dichotomy classifier, and the dichotomy result is output according to whether two finger vein images to be compared come from the same finger.

At S50, determine according to the dichotomy result whether the two finger vein images to be compared come from the same finger.

Further, S50 in which it is determined according to the dichotomy result whether the two finger vein images to be compared come from the same finger specifically includes the following steps.

At S51, if a value of the dichotomy result is 0, determine that the two finger vein images to be compared come from the same finger.

At S51, if the value of the dichotomy result is 1, determine that the two finger vein images to be compared do not come from the same finger.

Understandably, the dichotomy result being 0 means that two finger vein images to be compared come from the same finger, and the dichotomy result being 1 means that two finger vein images to be compared do not come from the same finger.

In S51 to S52, a specific implementation mode of determining, according to the dichotomy result, whether two finger vein images to be compared come from the same finger is provided, which can quickly obtain an accurate finger vein comparison result.

In the embodiments of the application, first of all, two finger vein images to be compared of single-channel images are obtained, and image channel fusion is performed on the two finger vein images to be compared to obtain a two-channel target finger vein image to be compared; one image can be used to represent two finger vein images to be compared through the fusion of image channels, and has a deep feature about the level of similarity between the two finger vein images to be compared after the fusion of image channels; based on the deep feature, it is possible to determine whether the two finger vein images to be compared come from the same finger; then, the target finger vein image to be compared is input into the feature extractor, and the feature vector of the target finger vein image to be compared is extracted by the feature extractor; the extracted feature vector can reflect the deep feature of the target finger vein image to be compared, and based on the feature vector, it is helpful to compare the finger vein image to be compared and obtain an accurate finger vein comparison result; at last, the feature vector of the target finger vein image to be compared is input into the dichotomy classifier to obtain the dichotomy result, and it is determined according to the dichotomy result whether the finger vein images to be compared come from the same finger. From the perspective of the deep feature of the finger vein image to be compared, the feature vector of the target finger vein image to be compared can be accurately distinguished by using the dichotomy classifier, and an accurate finger vein comparison result can be obtained.

It should be understood that, in the above embodiments, a magnitude of a sequence number of each step does not mean an execution sequence, and the execution sequence of each process should be determined by its function and an internal logic and should not form any limit to an implementation process of the embodiments of the disclosure.

Based on the finger vein comparison method provided in the embodiment, the application further provides a device embodiment for implementing each step in the method embodiment and the method.

Figure 2:
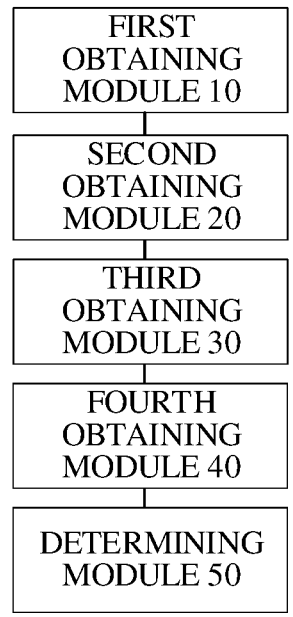
FIG. 2 is a schematic diagram of a finger vein comparison device according to an embodiment of the application.

FIG. 2 is a functional block diagram of a finger vein comparison device corresponding to the finger vein comparison method in the embodiment. As shown in FIG. 2, the finger vein comparison device includes: a first obtaining module 10, a second obtaining module 20, a third obtaining module 30, a fourth obtaining module 40, and a determining module 50. The functions realized by the first obtaining module 10, the second obtaining module 20, the third obtaining module 30, the fourth obtaining module 40, and the determining module 50 correspond to the steps of the finger vein comparison method in the embodiment, and will not be described in detail here for avoiding redundant elaboration.

The first obtaining module 10 is configured to obtain two finger vein images to be compared, which are single-channel images. The second obtaining module 20 is configured to fuse the two finger vein images to be compared on image channels to obtain the two-channel target finger vein image to be compared. The third obtaining module 30 is configured to input the target finger vein image to be compared into the feature extractor, and extract the feature vector of the target finger vein image to be compared by the feature extractor, the feature extractor being obtained by using the two-channel convolutional neural network to train. The fourth obtaining module 40 is configured to input the feature vector of the target finger vein image to be compared into the dichotomy classifier to obtain the dichotomy result. The determining module 50 is configured to determine according to the dichotomy result whether the two finger vein images to be compared come from the same finger.

Optionally, the second obtaining module 20 includes a first obtaining unit, a second obtaining unit, and a third obtaining unit. The first obtaining unit is configured to obtain the single-channel pixel matrix of the first finger vein image to be compared. The second obtaining unit is configured to obtain the single-channel pixel matrix of the second finger vein image to be compared. The third obtaining unit is configured to fuse the pixel values of corresponding positions in the single-channel pixel matrix of the first finger vein image to be compared and in the single-channel pixel matrix of the second finger vein image to be compared on image channels to obtain the target finger vein image to be compared.

Optionally, the finger vein comparison device further includes a fourth obtaining unit, a loss value obtaining unit, and a feature extractor obtaining unit. The fourth obtaining unit is configured to obtain the finger vein sample to be trained. The loss value obtaining unit is configured to input the finger vein sample to be trained into the two-channel convolutional neural network for training, and use the enhanced edge cosine loss function to calculate the loss value generated in the training process. The two-channel convolutional neural network includes four convolution layers, four pooling layers, and one fully connected layer. The first layer, the third layer, the fifth layer, and the seventh layer of the two-channel convolutional neural network are the convolution layers; the second layer, the fourth layer, the sixth layer, and the eighth layer are the pooling layers; and the ninth layer is the fully connected layer. The feature extractor obtaining unit is configured to update the two-channel convolutional neural network according to the loss value to obtain the feature extractor.

Optionally, the fourth obtaining unit includes a first obtaining subunit, a second obtaining subunit, a third obtaining subunit, a fourth obtaining subunit, and a fifth obtaining subunit. The first obtaining subunit is configured to obtain the single-channel finger vein image to be trained. The second obtaining subunit is configured to fuse every two single-channel finger vein images to be trained on image channels to obtain the two-channel finger vein image to be trained. The third obtaining subunit is configured to, when the single-channel finger vein images to be trained for fusing come from the same finger, set the label value of the two-channel finger vein image to be trained to 0. The fourth obtaining subunit is configured to, when the single-channel finger vein images to be trained do not for fusing come from the same finger, set the label value of the two-channel finger vein image to be trained to 1. The fifth obtaining subunit is configured to obtain the finger vein sample to be trained according to the set label value.

Optionally, the determining module 50 includes a first determining unit and a second determining unit. The first determining unit is configured to, when a value of the dichotomy result is 0, determine that the two finger vein images to be compared come from the same finger. The second determining unit is configured to, when the value of the dichotomy result is 1, determine that the two finger vein images to be compared do not come from the same finger.

In the embodiments of the application, first of all, two finger vein images to be compared of single-channel images are obtained, and image channel fusion is performed on the two finger vein images to be compared to obtain a two-channel target finger vein image to be compared; one image can be used to represent two finger vein images to be compared through the fusion of image channels, and has a deep feature about the level of similarity between the two finger vein images to be compared after the fusion of image channels; based on the deep feature, it is possible to determine whether the two finger vein images to be compared come from the same finger; then, the target finger vein image to be compared is input into the feature extractor, and the feature vector of the target finger vein image to be compared is extracted by the feature extractor; the extracted feature vector can reflect the deep feature of the target finger vein image to be compared, and based on the feature vector, it is helpful to compare the finger vein image to be compared and obtain an accurate finger vein comparison result; at last, the feature vector of the target finger vein image to be compared is input into the dichotomy classifier to obtain the dichotomy result, and it is determined according to the dichotomy result whether the finger vein images to be compared come from the same finger. From the perspective of the deep feature of the finger vein image to be compared, the feature vector of the target finger vein image to be compared can be accurately distinguished by using the dichotomy classifier, and an accurate finger vein comparison result can be obtained.

The embodiment provides a non-transitory computer readable storage medium, in which a computer readable instruction is stored. The computer readable instruction, when executed by a processor, implements the finger vein comparison method, which will not be repeated here for avoiding repetition. Or, the computer readable instruction, when executed by the processor, realizes the function of each module/unit in the finger vein comparison device, which will not be repeated here for avoiding repetition.

Figure 3:
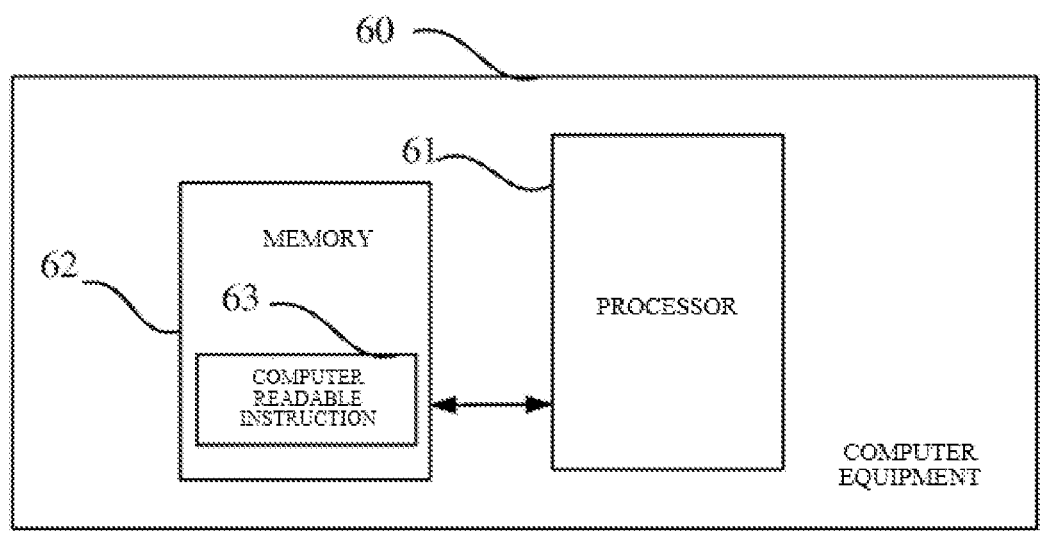
FIG. 3 is a schematic diagram of computer equipment according to an embodiment of the application.

FIG. 3 is a schematic diagram of a computer equipment provided in an embodiment of the application. As shown in FIG. 3, the computer equipment 60 in the embodiment includes: a processor 61, a memory 62, and a computer readable instruction 63 stored in the memory 62 and capable of running on the processor 61. The computer readable instruction 63, when executed by the processor 61, implements the finger vein comparison method in the embodiment, which will not be repeated here for avoiding repetition. Or, the computer readable instruction 63, when executed by the processor 61, realizes the function of each module/unit in the finger vein comparison device, which will not be repeated here for avoiding repetition.

The computer equipment 60 may be a desktop computer, a laptop, a PDA, a cloud server, and so on. The computer equipment 60 may include, but not limited to, the processor 61 and the memory 62. Those of ordinary skill in the art may understand that the FIG. 3 is only an example of the computer equipment 60 and does not form a limit to the computer equipment 60. The server may include more or fewer parts than shown, or some combination of parts, or different parts. For example, the computer equipment may further include an input/output device, a network access device, a bus, etc.

The processor 61 may be a Central Processing Unit (CPU), and may also be other universal processor, a Digital Signal Processor (DSP), an ASIC, an FPGA or other programmable logic devices, discrete gates or transistor logic devices, and discrete hardware component, etc. The universal processor may be a microprocessor, or the processor may also be any conventional processor and the like.

The memory 62 may be an internal storage unit of the computer equipment 60, such as a hard disk or memory of the computer equipment 60. The memory 62 may also be an external storage device of the computer equipment 60, such as a plug-in hard disk, a Smart Media Card (SMC), a Secure Digital (SD) card, and a flash card, provided on the computer equipment 60. Further, the memory 62 may further include both the internal storage unit and the external storage device of the computer equipment 60. The memory 62 is used to store the computer readable instruction and other programs and data needed by the computer equipment. The memory 62 may also be used for temporarily store data that has been or will be output.

Those of ordinary skill in the art may clearly understand that, for convenience and simplicity of description, illustration is given only based on the division of the above functional units and modules. In the practical applications, the above functions may be allocated to different functional units and modules for realization according to needs, that is, the internal structure of the device is divided into different functional units or modules to realize all or part of the functions described above.

The above embodiments are only used for illustrating, but not limiting, the technical solutions of the disclosure. Although the disclosure is elaborated referring to the above embodiments, those of ordinary skill in the art should understand that they may still modify the technical solutions in each above embodiment, or equivalently replace a part of technical features; but these modifications and replacements do not make the nature of the corresponding technical solutions depart from the spirit and scope of the technical solutions in each embodiment of the disclosure, and these modifications and replacements should be included in the scope of protection of the disclosure.

What is claimed is:

1. A finger vein comparison method, comprising:
obtaining two finger vein images to be compared, wherein the two finger vein images to be compared are single-channel images;
performing image channel fusion on the two finger vein images to be compared to obtain a two-channel target finger vein image to be compared;
inputting the target finger vein image to be compared into a feature extractor, and extracting a feature vector of the target finger vein image to be compared by the feature extractor, wherein the feature extractor is trained by using a two-channel convolutional neural network;
inputting the feature vector of the target finger vein image to be compared into a dichotomy classifier to obtain a dichotomy result; and
determining according to the dichotomy result whether the two finger vein images to be compared come from a same finger.

2. The method as claimed in claim 1, wherein performing image channel fusion on the two finger vein images to be compared to obtain the two-channel target finger vein image to be compared comprises:
obtaining a single-channel pixel matrix of a first finger vein image to be compared;
obtaining a single-channel pixel matrix of a second finger vein image to be compared; and
performing image channel fusion on pixel values of corresponding positions in the single-channel pixel matrix of the first finger vein image to be compared and in the single-channel pixel matrix of the second finger vein image to be compared, to obtain the target finger vein image to be compared.

3. The method as claimed in claim 1, further comprising before inputting the target finger vein image to be compared into the feature extractor:
obtaining a finger vein sample to be trained;
inputting the finger vein sample to be trained into the two-channel convolutional neural network for a training process, and using an enhanced edge cosine loss function to calculate a loss value generated in the training process, wherein the two-channel convolutional neural network comprises four convolution layers, four pooling layers, and one fully connected layer, wherein the first layer, the third layer, the fifth layer, and the seventh layer of the two-channel convolutional neural network are the convolution layers, wherein the second layer, the fourth layer, the sixth layer, and the eighth layer are the pooling layers, and wherein the ninth layer is the fully connected layer; and
updating the two-channel convolutional neural network according to the loss value to obtain the feature extractor.

4. The method as claimed in claim 3, wherein obtaining the finger vein sample to be trained comprises:
obtaining single-channel finger vein images to be trained;
performing image channel fusion on every two single-channel finger vein images to be trained to obtain a two-channel finger vein image to be trained;
when the single-channel finger vein images to be trained for fusing come from the same finger, setting a label value of the two-channel finger vein image to be trained to 0;
when the single-channel finger vein images to be trained for fusing do not come from the same finger, setting the label value of the two-channel finger vein image to be trained to 1; and
obtaining the finger vein sample to be trained according to the set label value.

5. The method as claimed in claim 1, wherein determining according to the dichotomy result whether the two finger vein images to be compared come from the same finger comprises:
when a value of the dichotomy result is 0, determining that the two finger vein images to be compared come from the same finger; and
when the value of the dichotomy result is 1, determining that the two finger vein images to be compared do not come from the same finger.

6. The method as claimed in claim 2, wherein determining according to the dichotomy result whether the two finger vein images to be compared come from the same finger comprises:
when a value of the dichotomy result is 0, determining that the two finger vein images to be compared come from the same finger; and
when the value of the dichotomy result is 1, determining that the two finger vein images to be compared do not come from the same finger.

7. The method as claimed in claim 3, wherein determining according to the dichotomy result whether the two finger vein images to be compared come from the same finger comprises:
when a value of the dichotomy result is 0, determining that the two finger vein images to be compared come from the same finger; and
when the value of the dichotomy result is 1, determining that the two finger vein images to be compared do not come from the same finger.

8. Computer equipment, comprising:
a memory, a processor, and a computer readable instruction stored in the memory and capable of running on the processor, wherein the processor, when executing the computer readable instruction, implements:
obtaining two finger vein images to be compared, wherein the two finger vein images are single-channel images;
performing image channel fusion on the two finger vein images to be compared to obtain a two-channel target finger vein image to be compared;
inputting the target finger vein image to be compared into a feature extractor, and extracting a feature vector of the target finger vein image to be compared by the feature extractor, wherein the feature extractor is trained by using a two-channel convolutional neural network;
inputting the feature vector of the target finger vein image to be compared into a dichotomy classifier to obtain a dichotomy result; and
determining according to the dichotomy result whether the two finger vein images to be compared come from a same finger.

9. The computer equipment as claimed in claim 8, wherein to implement performing image channel fusion on the two finger vein images to be compared to obtain the two-channel target finger vein image to be compared, the processor executes the computer readable instruction to implement:

obtaining a single-channel pixel matrix of a first finger vein image to be compared;

obtaining a single-channel pixel matrix of a second finger vein image to be compared; and performing image channel fusion on pixel values of corresponding positions in the single-channel pixel matrix of the first finger vein image to be compared and in the single-channel pixel matrix of the second finger vein image to be compared, to obtain the target finger vein image to be compared.

10. The computer equipment as claimed in claim 8, wherein the processor, when executing the computer readable instruction, further implements:

before inputting the target finger vein image to be compared into the feature extractor, obtaining a finger vein sample to be trained;

inputting the finger vein sample to be trained into the two-channel convolutional neural network for a training process, and using an enhanced edge cosine loss function to calculate a loss value generated in the training process, wherein the two-channel convolutional neural network comprises four convolution layers, four pooling layers, and one fully connected layer, wherein the first layer, the third layer, the fifth layer, and the seventh layer of the two-channel convolutional neural network are the convolution layers, wherein the second layer, the fourth layer, the sixth layer, and the eighth layer are the pooling layers, and wherein the ninth layer is the fully connected layer; and updating the two-channel convolutional neural network according to the loss value to obtain the feature extractor.

11. The computer equipment as claimed in claim 10, wherein to implement obtaining the finger vein sample to be trained, the processor executes the computer readable instruction to implement:

obtaining single-channel finger vein images to be trained;

performing image channel fusion on every two single-channel finger vein images to be trained to obtain a two-channel finger vein image to be trained;

when the single-channel finger vein images to be trained for fusing come from the same finger, setting a label value of the two-channel finger vein image to be trained to 0;

when the single-channel finger vein images to be trained for fusing do not come from the same finger, setting the label value of the two-channel finger vein image to be trained to 1; and obtaining the finger vein sample to be trained according to the set label value.

12. The computer equipment as claimed in claim 8, wherein to implement determining according to the dichotomy result whether the two finger vein images to be compared come from the same finger, the processor executes the computer readable instruction to implement:

when a value of the dichotomy result is 0, determining that the two finger vein images to be compared come from the same finger; and when the value of the dichotomy result is 1, determining that the two finger vein images to be compared do not come from the same finger.

13. The computer equipment as claimed in claim 9, wherein to implement determining according to the dichotomy result whether the two finger vein images to be compared come from the same finger, the processor executes the computer readable instruction to implement:

when a value of the dichotomy result is 0, determining that the two finger vein images to be compared come from the same finger; and when the value of the dichotomy result is 1, determining that the two finger vein images to be compared do not come from the same finger.

14. The computer equipment as claimed in claim 10, wherein to implement determining according to the dichotomy result whether the two finger vein images to be compared come from the same finger, the processor executes the computer readable instruction to implement:

when a value of the dichotomy result is 0, determining that the two finger vein images to be compared come from the same finger; and when the value of the dichotomy result is 1, determining that the two finger vein images to be compared do not come from the same finger.

15. A non-transitory computer readable storage medium that stores a computer readable instruction, wherein the computer readable instruction, when executed by a processor, enables the processor to implement:

obtaining two finger vein images to be compared are obtained, wherein the two finger vein images are single-channel images;

performing image channel fusion on the two finger vein images to be compared to obtain a two-channel target finger vein image to be compared;

inputting the target finger vein image to be compared into a feature extractor, and extracting a feature vector of the target finger vein image to be compared by the feature extractor, wherein the feature extractor is trained by using a two-channel convolutional neural network;

inputting the feature vector of the target finger vein image to be compared into a dichotomy classifier to obtain a dichotomy result; and determining according to the dichotomy result whether the two finger vein images to be compared come from a same finger.

16. The non-transitory computer readable storage medium as claimed in claim 15, to implement performing image channel fusion on the two finger vein images to be compared to obtain the two-channel target finger vein image to be compared, the computer readable instruction is executed by the processor to implement:

obtaining a single-channel pixel matrix of a first finger vein image to be compared;

obtaining a single-channel pixel matrix of a second finger vein image to be compared; and performing image channel fusion on pixel values of corresponding positions in the single-channel pixel matrix of the first finger vein image to be compared and in the single-channel pixel matrix of the second finger vein image to be compared, to obtain the target finger vein image to be compared.

17. The non-transitory computer readable storage medium as claimed in claim 15, wherein the computer readable instruction, when executed by the processor, enables the processor to further implement:

before inputting the target finger vein image to be compared into the feature extractor, obtaining a finger vein sample to be trained;

inputting the finger vein sample to be trained into the two-channel convolutional neural network for a training process, and using an enhanced edge cosine loss function to calculate a loss value generated in the training process, wherein the two-channel convolutional neural network comprises four convolution layers, four pooling layers, and one fully connected layer, wherein the first layer, the third layer, the fifth layer, and the seventh layer of the two-channel convolutional neural network are the convolution layers, wherein the second layer, the fourth layer, the sixth layer, and the eighth layer are the pooling layers, and wherein the ninth layer is the fully connected layer; and updating the two-channel convolutional neural network according to the loss value to obtain the feature extractor.

18. The non-transitory computer readable storage medium as claimed in claim 17, wherein to implement obtaining the finger vein sample to be trained, the computer readable instruction is executed by the processor to implement:

obtaining single-channel finger vein images to be trained;

performing image channel fusion on every two single-channel finger vein images to be trained to obtain a two-channel finger vein image to be trained;

when the single-channel finger vein images to be trained for fusing come from the same finger, setting a label value of the two-channel finger vein image to be trained to 0;

when the single-channel finger vein images to be trained for fusing do not come from the same finger, setting the label value of the two-channel finger vein image to be trained to 1; and obtaining the finger vein sample to be trained according to the set label value.

19. The non-transitory computer readable storage medium as claimed in claim 15, wherein to implement determining according to the dichotomy result whether the two finger vein images to be compared come from the same finger, the computer readable instruction is executed by the processor to implement:

when a value of the dichotomy result is 0, determining that the two finger vein images to be compared come from the same finger; and when the value of the dichotomy result is 1, determining that the two finger vein images to be compared do not come from the same finger.

20. The non-transitory computer readable storage medium as claimed in claim 16, wherein to implement determining according to the dichotomy result whether the two finger vein images to be compared come from the same finger, the computer readable instruction is executed by the processor to implement:

when a value of the dichotomy result is 0, determining that the two finger vein images to be compared come from the same finger; and when the value of the dichotomy result is 1, determining that the two finger vein images to be compared do not come from the same finger.

* * * * *